US009206640B1

(12) United States Patent
Jennings et al.

(10) Patent No.: US 9,206,640 B1
(45) Date of Patent: *Dec. 8, 2015

(54) CLUTCH FOR A ROLLER SHADE INCLUDING A RIBBED SPINDLE

(71) Applicant: Joseph J. Daniels, Roslyn Heights, NY (US)

(72) Inventors: Maria-Teresa Jennings, Ridgefield, CT (US); Stewart Swiss, Lloyd Harbor, NY (US)

(73) Assignee: Joseph J. Daniels, Roslyn Heights, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/216,492

(22) Filed: Mar. 17, 2014

Related U.S. Application Data

(63) Continuation of application No. 13/341,126, filed on Dec. 30, 2011, now Pat. No. 8,672,115.

(51) Int. Cl.
| | |
|---|---|
| *E06B 9/42* | (2006.01) |
| *E06B 9/56* | (2006.01) |
| *E06B 9/90* | (2006.01) |
| *E06B 9/50* | (2006.01) |
| *F16D 49/02* | (2006.01) |

(52) U.S. Cl.
CPC ... *E06B 9/42* (2013.01); *E06B 9/50* (2013.01); *E06B 9/56* (2013.01); *F16D 49/02* (2013.01); *E06B 2009/905* (2013.01)

(58) Field of Classification Search
CPC .......................... E06B 2009/905; F16D 49/02
USPC ........ 192/223.4; 160/291, 298, 307, 308, 321
See application file for complete search history.

(56) References Cited

U.S. PATENT DOCUMENTS

| | | | |
|---|---|---|---|
| 556,255 | A | 3/1896 | Darling |
| 651,611 | A | 6/1900 | Reid |
| 1,067,708 | A | 7/1913 | Anderson, Sr. et al. |
| 1,070,042 | A | 8/1913 | Kottkay |
| 1,238,931 | A | 9/1917 | Murray |
| 1,356,237 | A | 10/1920 | Szefczyk |
| 3,186,474 | A | 6/1965 | Levitas |
| 3,220,523 | A | 11/1965 | Hepner |
| 3,389,738 | A | 6/1968 | Roth |

(Continued)

FOREIGN PATENT DOCUMENTS

| | | |
|---|---|---|
| WO | 9605400 | 2/1996 |
| WO | 0050290 | 8/2000 |

(Continued)

OTHER PUBLICATIONS

International Search Report corresponding to International Application No. PCT/US2010/059679 mailed Apr. 26, 2011.

(Continued)

*Primary Examiner* — Richard Lorence
(74) *Attorney, Agent, or Firm* — Amster, Rothstein & Ebenstein, LLP

(57) ABSTRACT

A roller shade clutch is disclosed. In exemplary embodiments the clutch may comprise a housing, a ribbed post extending axially from the housing, a sprocket wheel mounted for rotation around the post, at least one torsion spring mounted for rotation on the ribbed post, a chain guard, a boss extending axially from the sprocket wheel, and a drum disposed over the ribbed post, the torsion spring and the boss.

15 Claims, 6 Drawing Sheets

(56) References Cited

U.S. PATENT DOCUMENTS

| | | | |
|---|---|---|---|
| 3,521,694 | A | 7/1970 | Anderson |
| 3,580,323 | A | 5/1971 | Gossling et al. |
| 4,006,770 | A | 2/1977 | Ferguson |
| 4,223,714 | A | 9/1980 | Weinreich |
| 4,323,105 | A | 4/1982 | Berman et al. |
| 4,372,432 | A | 2/1983 | Waine et al. |
| 4,433,765 | A | 2/1984 | Rude et al. |
| RE31,793 | E | 1/1985 | Berman et al. |
| 4,539,238 | A | 9/1985 | Markowitz |
| 4,865,109 | A | 9/1989 | Sherman |
| 5,016,701 | A | 5/1991 | Vore |
| 5,029,629 | A | 7/1991 | Cheng-Pei |
| 5,203,395 | A | 4/1993 | Koller et al. |
| 5,375,643 | A | 12/1994 | Rude |
| 5,505,418 | A | 4/1996 | Corcoran |
| 5,507,374 | A | 4/1996 | Rude |
| 5,566,741 | A | 10/1996 | Ogawara et al. |
| 5,791,393 | A | 8/1998 | Judkins |
| 5,881,792 | A | 3/1999 | Cheng |
| 6,158,563 | A | 12/2000 | Welfonder et al. |
| 6,164,428 | A | 12/2000 | Berman et al. |
| 6,173,825 | B1 | 1/2001 | Liu |
| 6,196,508 | B1 | 3/2001 | Nijs |
| 6,457,688 | B1 | 10/2002 | Welfonder |
| 6,540,044 | B1 | 4/2003 | Bohringer et al. |
| 6,685,592 | B2 | 2/2004 | Fraczek et al. |
| 6,935,401 | B2 | 8/2005 | Fraczek et al. |
| 7,051,782 | B2 | 5/2006 | Nichols, Jr. et al. |
| 7,100,668 | B2 | 9/2006 | Allsop |
| 7,240,716 | B2 | 7/2007 | Nichols, Jr. et al. |
| D557,117 | S | 12/2007 | Cannaverde et al. |
| 7,380,582 | B1 | 6/2008 | Anderson et al. |
| 7,387,150 | B2 | 6/2008 | Liu |
| 7,677,293 | B2 | 3/2010 | Allsopp |
| 7,836,937 | B2 | 11/2010 | Anderson et al. |
| 8,136,569 | B2 | 3/2012 | Bohlen et al. |
| 8,672,115 | B1 | 3/2014 | Jennings |
| 2003/0085003 | A1 | 5/2003 | Cheng |
| 2003/0178276 | A1 | 9/2003 | Fraczek et al. |
| 2004/0003904 | A1 | 1/2004 | Fraczek et al. |
| 2005/0011618 | A1 | 1/2005 | Kee |
| 2005/0039866 | A1 | 2/2005 | Allsopp |
| 2005/0087313 | A1 | 4/2005 | Nichols, Jr. et al. |
| 2006/0137833 | A1 | 6/2006 | Nichols, Jr. et al. |
| 2006/0272782 | A1 | 12/2006 | Nichols, Jr. et al. |
| 2007/0007100 | A1 | 1/2007 | Allsopp |
| 2007/0056699 | A1 | 3/2007 | Liu |
| 2008/0121353 | A1 | 5/2008 | Detmer et al. |
| 2008/0202709 | A1 | 8/2008 | Anderson et al. |
| 2010/0219306 | A1 | 9/2010 | Detmer et al. |
| 2011/0031343 | A1 | 2/2011 | Anderson et al. |
| 2011/0139381 | A1 | 6/2011 | Daniels |
| 2011/0139382 | A1 | 6/2011 | Daniels |

FOREIGN PATENT DOCUMENTS

| | | |
|---|---|---|
| WO | 03080978 A2 | 10/2003 |
| WO | 03080981 A2 | 10/2003 |
| WO | 2005016083 A1 | 2/2005 |
| WO | 2005040542 A2 | 5/2005 |
| WO | 2011072120 | 6/2011 |

OTHER PUBLICATIONS

Written Opinion corresponding to International Application No. PCT/US2010/059679 mailed Apr. 26, 2011.

International Search Report corresponding to International Application No. PCT/US2011/037919 mailed Sep. 15, 2011.

Written Opinion corresponding to International Application No. PCT/US2011/037919 mailed Sep. 15, 2011.

U.S. Appl. No. 61/331,082, filed May 4, 2010, expired.

United States Trademark Registration No. 3,356,395, registered Dec. 18, 2007.

United States Trademark Registration No. 2,965,513, registered Jul. 12, 2005.

CLUTCH FOR A ROLLER SHADE INCLUDING A RIBBED SPINDLE

RELATED APPLICATIONS

This patent application claims the benefit of and priority to U.S. patent application Ser. No. 13/341,126, filed Dec. 30, 2011, the entire contents of which is incorporated by reference herein. This patent application is related to U.S. patent application Ser. No. 12/786,672, entitled System for Operating and Positioning a Roller Shade, filed May 25, 2010, which is a continuation-in-part of U.S. patent application Ser. No. 12/635,290, entitled System for Operating and Positioning a Roller Shade, filed Dec. 10, 2009, and is related to PCT Application Ser. No. PCT/US10/59679, entitled System for Operating and Positioning a Roller Shade, filed Dec. 9, 2010, and PCT application Serial No. PCT/US11/37919, entitled System for Operating and Positioning a Roller Shade, filed May 25, 2011, the contents all of which are incorporated herein by reference in their entirety as if fully set forth herein.

FIELD OF THE INVENTION

The present disclosure generally relates to a system for operating and positioning a window shade.

SUMMARY OF THE INVENTION

The present disclosure generally relates to a system for operating and positioning a window shade. In exemplary embodiments, a roller shade clutch may comprise a housing, a ribbed post extending axially from the housing, a sprocket wheel mounted for rotation around the ribbed post, at least one torsion spring mounted for rotation on the ribbed post, a chain guard, a boss extending axially from the sprocket wheel, and a drum disposed over the ribbed post, the torsion spring and the boss.

In exemplary embodiments, a roller shade clutch can comprise a housing and a ribbed post extending axially from the housing. In exemplary embodiments, the ribbed post may comprise a cylinder comprising an open end, a closed end, a shoulder adjacent the closed end, an internal surface and an external surface, and a barrel comprising a plurality of alternating ribs and channels on at least the external surface substantially extending between the closed end and the shoulder. In exemplary embodiments, the roller shade clutch can further comprise a sprocket wheel mounted for rotation around the ribbed post and a boss extending axially from the sprocket wheel attached to the sprocket wheel. In exemplary embodiments, the boss may have a proximal end and a distal end and an axial slot substantially extending between the proximal end and the distal end. In exemplary embodiments, the roller shade clutch can further comprise at least one torsion spring mounted for rotation on the ribbed post, a chain guard, and a drum disposed over the boss, the at least one torsion spring, and the ribbed post.

In exemplary embodiments, ribbed post can further comprise a flanged rim attached to the circumference of the shoulder adjacent the open end. In exemplary embodiments, the flanged rim can comprise one or more cut-outs. In exemplary embodiments, the one or more cut outs can comprise a substantially semi-circular shape.

These and other features of this disclosure are described in, or are apparent from, the following detailed description of various exemplary embodiments of this disclosure.

BRIEF DESCRIPTION OF THE DRAWINGS

The features and advantages of the present disclosure will be more fully understood with reference to the following, detailed description when taken in conjunction with the accompanying figures, wherein.

Figure 1:
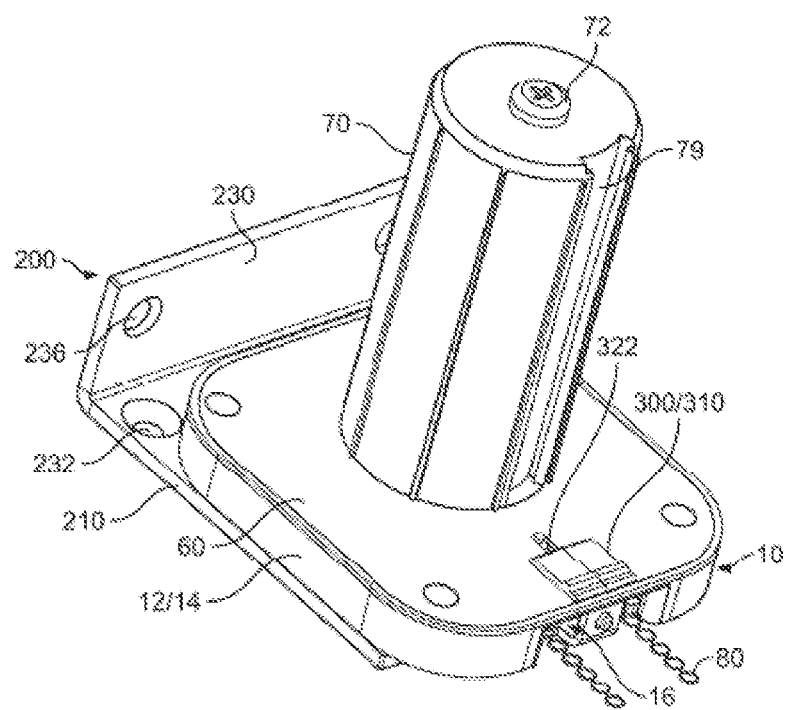
FIG. 1 is an isometric view of a roller shade clutch assembly according to an exemplary embodiment.
Figure 2:
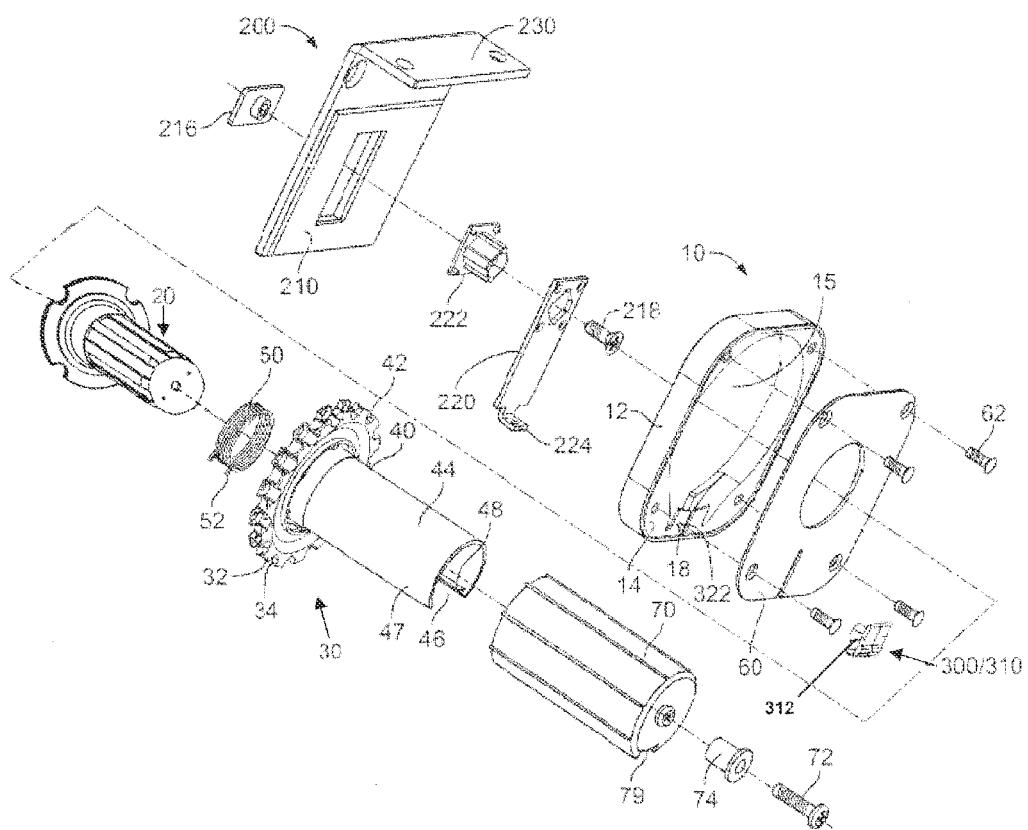
FIGS. 2-3 are exploded views of the roller shade clutch assembly of FIG. 1.
Figure 3:
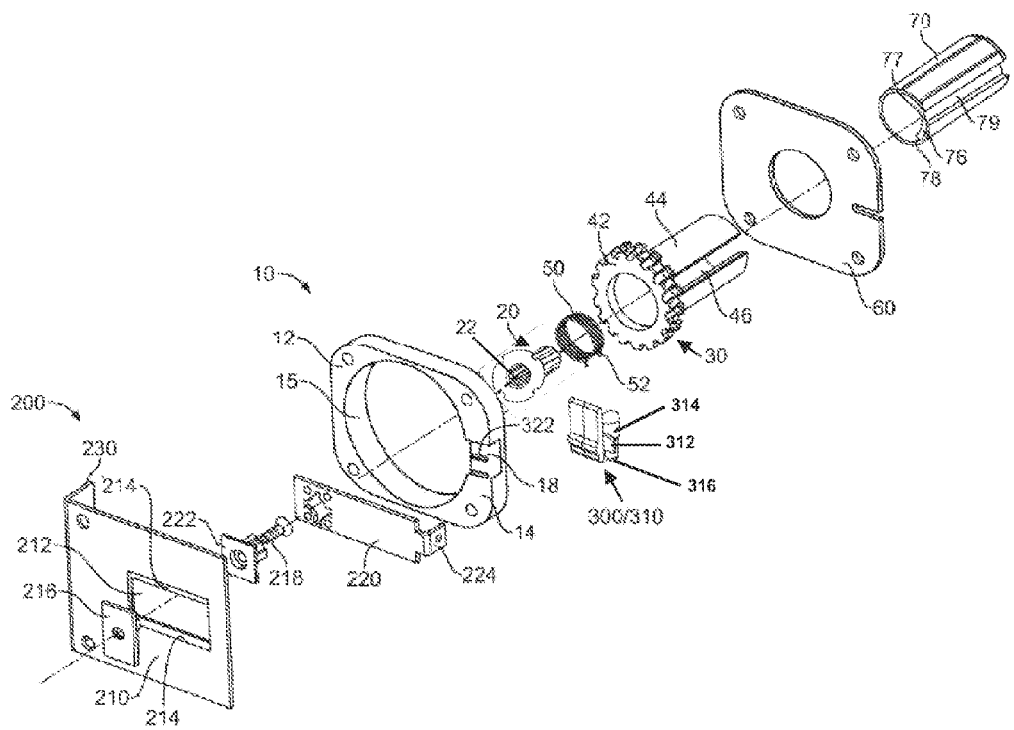

The headings used herein are for organizational purposes only and are not meant to be used to limit the scope of the description. As used throughout this application, the words "may" and "can" are used in a permissive sense (i.e., meaning having the potential to), rather than the mandatory sense (i.e., meaning must). Similarly, the words "include," "including," and "includes" can mean including but not limited to. To facilitate understanding, like reference numerals have been used, where possible, to designate like elements common to the figures.

DETAILED DESCRIPTION

The present disclosure generally relates to a system for operating and positioning a window shade. In exemplary embodiments, the system includes a ribbed spindle and/or ribbed post for the system for operating and positioning a window shade, such as a roller shade. The following detailed description generally describes various exemplary embodiments of the present disclosure, as depicted in FIGS. 1-5, and should not be considered limiting to other equally effective embodiments, as understood to those of ordinary skill in the art.

In the following detailed description, numerous specific details are set forth in order to provide a thorough understanding of embodiments or other examples described herein. In some instances, well-known methods, procedures, and components have not been described in detail, so as to not obscure the following description. Further, the examples disclosed are for exemplary purposes only and other examples may be employed in lieu of, or in combination with, the examples disclosed.

As used herein, the terms "spindle" and "ribbed post" may generally be used interchangeably. In exemplary embodiments, the terms "spindle" and "ribbed post" may reflect a component of a roller shade clutch assembly. The "spindle" and "ribbed post" may generally be adapted to fit onto a shade mounting bracket. Additionally, a torsion spring for use with the clutch assembly may be frictionally secured on an outer surface of the spindle/ribbed post. The spindle/ribbed post may be described in greater detail infra, in the descriptions FIGS. 1-5. For ease, the spindle/ribbed post may generally be referred to as a "ribbed post."

Referring to FIGS. 1-5, a roller shade clutch 10 according to an exemplary embodiment may comprise a housing 12, a ribbed post 20 extending axially from the housing 12, a sprocket wheel 30 mounted for rotation around the ribbed post 20, a boss 44 extending axially from the sprocket wheel 30, at least one torsion spring 50 mounted for rotation on the ribbed post 20, a chain guard 60, and a drum 70 disposed over the ribbed post 20, torsion spring 50, and boss 44. In exemplary embodiments, additional components may also be included in the roller shade clutch 10, such as a chain guard cover and other details as described U.S. patent application Ser. No. 12/786,672, entitled System for Operating and Positioning a Roller Shade, filed May 25, 2010, which is hereby incorporated by reference in its entirety as if set forth herein.

As shown in FIGS. 1-5, exemplary embodiments may include a ribbed post 20 comprising plastic and/or metal. However, it should be understood non-plastic and non-metal ribbed posts are contemplated by and within the scope of the present disclosure. As shown in FIGS. 1-5, exemplary embodiments may include a specific number of ribs 21, 26, and channels 23, 28. However, it should be understood that any number of ribs 21, 26 and channels 23, 28 is contemplated by and within the scope of the present disclosure.

In exemplary embodiments, the housing 12 may include a guard 14 disposed around the perimeter that defines a cavity 15 which the sprocket wheel 30 is seated. The guard 14 can guide a cord or chain 80 around the sprocket wheel 30. A chain outlet 16 can be formed in the guard 14 on the lower portion of the housing 12 through which the chain 80 exits. At least one chain diverter may be disposed in the chain outlet 16 to form two or more channels though which the chain 80 may pass. The section of the guard 14 spanning the chain outlet 16 is referred to as the chain guard 18.

In exemplary embodiments, the ribbed post 20 may extend axially from the housing 12. In exemplary embodiments, the ribbed post 20 may be formed integrally with the housing 12 such that it extends from the inner surface of housing 12 and a socket 22 may be formed in the rear surface of the housing 12. Alternatively, the ribbed post 20 may extend through a central bore formed within the housing 12. The ribbed post 20 may be comprised of metal, but the ribbed post 20 may also be formed from plastic and surrounded by a metal sleeve. A socket 22 may be formed in the rear surface of the ribbed post 20 to receive an insert 222 for attachment to the bracket 200. The connection between the socket 22 and the insert 222 may also serve to prevent the ribbed post 20 from rotating in relation to the housing 12 and bracket 200.

Figure 4A:
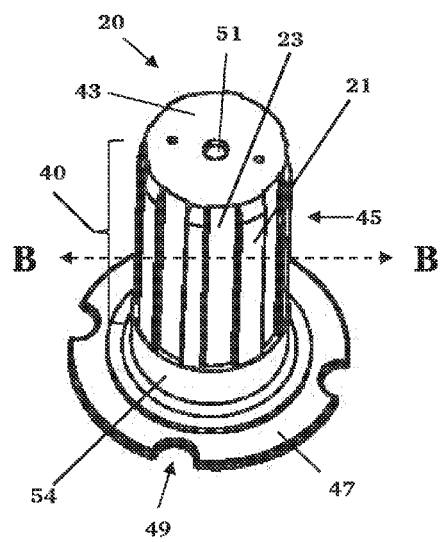
FIGS. 4A-4B are perspective views of opposing sides of a spindle and/or ribbed post for the roller shade clutch assembly of FIG. 1.
Figure 4B:
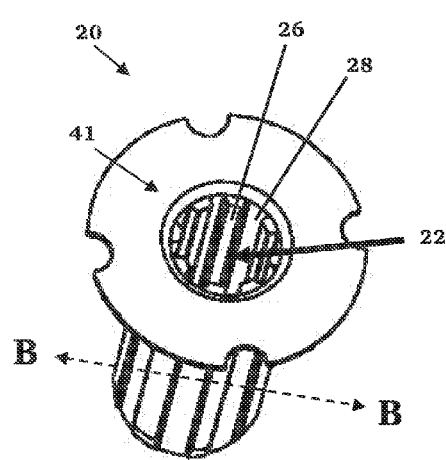

Referring now to FIGS. 4A and 4B, in exemplary embodiments, the ribbed post 20 can comprise a cylinder 40 comprising an open end 41 and a closed end 43, a shoulder 54 adjacent the open end 41, an internal surface, an external surface, and a barrel 45 comprising a plurality of alternating external ribs 21 and external channels 23 extending between the closed end 43 and the shoulder 54, and a flanged rim 47 attached to the circumference of the barrel 45 adjacent the open end 41. In exemplary embodiments, the shoulder 54 may extend between the barrel 45 and the flange 47. Alternative locations of the shoulder 54 are contemplated by and within exemplary embodiments of the present disclosure. By way of example, the shoulder 54 may be disposed in the middle of the ribbed post 20, adjacent the closed end 43, or any location on the longitudinal length of the barrel 45, to name a few. The shoulder 54 may be continuous or may comprise one or more channels (not shown).

The outer diameter of the shoulder 54 may be substantially equal to the outer diameter of the external ribs 21. The shoulder 54 may comprise a longitudinal length substantially less than the longitudinal length of the barrel 45. The shoulder 54 may comprise a substantially smooth surface. The shoulder 54 may be adapted to support the torsion spring 50 in a workable position and reduce and/or eliminate misassembly. The shoulder 54 may also be adapted to prevent the torsion spring 50 from slipping into a position wherein the torsion spring 50 may get jammed and/or potentially damage the clutch 10.

In exemplary embodiments, the flanged rim 47 may comprise one or more cut-outs 49. The cut-outs 49 may be adapted to provide support for the ribbed post 20 such that rotational movement of the ribbed post 20 is substantially prevented by coupling the cut-outs 49 with securing members (not shown). In exemplary embodiments, the cut-outs 49 may comprise a semi-circular shape. Alternative shapes for the cut-outs 49 are also contemplated by the present disclosure. By way of example, the cut-outs 49 may be square, rectangular, triangular, or any other feasible shape, to name a few. In exemplary embodiments, the flanged rim 47 may comprise four cut-outs 49 spaced at equal distances apart along the circumference of the flanged rim 47. Alternative numbers and spacing of the cut-outs 49 are contemplated by the present disclosure. By way of example, the flanged rim 47 may comprise 0, 1, 2, 3, 4, or 8 cutouts, to name a few. The cutouts may be evenly spaced apart or may be spaced apart at unequal intervals.

In exemplary embodiments, the closed end 43 may comprise a fastening aperture 51 adapted to receive a mechanical fastening means 72. In exemplary embodiments, the ribbed post 20 may comprise a socket 22 comprising internal ribs 26 and internal channels 28. In exemplary embodiments, the internal ribs 26 and internal channels 28 may comprise a substantially uniform size and/or shape. Internal ribs 26 and channels 28 may comprise any size and/or pattern consistent with embodiments of the present disclosure. The socket 22 may be adapted to couple with an insert 222 for a bracket 200, or the like. In exemplary embodiments, the internal ribs 26 and internal channels 28 may extend between the closed end 43 and the open end 41. In exemplary embodiments, the internal ribs 26 can form a substantially consistent and/or uniform inner diameter.

In exemplary embodiments, the plurality of external ribs 21 can form a consistent and/or uniform circular outer diameter. In exemplary embodiments, the outer diameter of the external ribs 21 may comprise Ø0.956. All feasible measurements of the outer diameter of the external ribs 21 are contemplated by embodiments of the present disclosure. In exemplary embodiments, the outer diameter of the plurality of external ribs 21 may be adapted to receive an inner diameter of a torsion spring or springs 50, and further adapted to allow the torsion spring or springs 50 to actuate in a substantially consistent and predictable manner, thereby strengthening the output of the clutch 10 for a roller shade. A consistent diameter of the external ribs 21 may reduce and/or eliminate inconsistencies in the outer surface of the post 20. In addition, by using a ribbed surface, the post 20 may form a better connection with the torsion spring 50 and the bracket 200.

Figure 5:
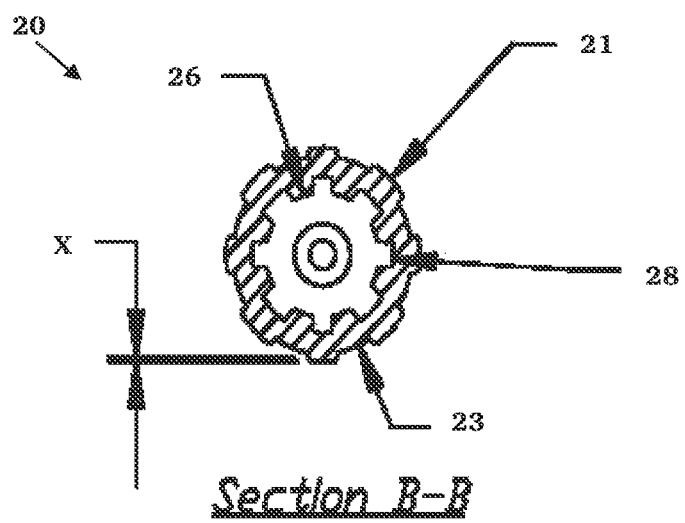
FIG. 5 is a cross-sectional view of a spindle and/or ribbed post of FIGS. 4A-4B.

Referring now to FIG. 5, a cross sectional view along line B-B of the ribbed post 20 for the roller shade clutch assembly is shown. In exemplary embodiments, the ribbed post 20 may comprise one or more alternating external ribs 21 and external channels 23 around the external surface of the barrel 45 of the ribbed post 20. In exemplary embodiments, the ribbed post 20 may comprise corresponding internal channels 28 and internal ribs 26, such that the internal ribs 26 correspond to the external channels 23 and the internal channels 28 correspond to the external ribs 21. In exemplary embodiments, the measurement X may comprise 0.015×45°, thereby allowing smooth operation of the springs when releasing and braking and allowing smooth operation of the clutch. Other feasible measurements of X are also contemplated by and within exemplary embodiments of the present disclosure.

In exemplary embodiments, the external ribs 21 may comprise a substantially uniform size and shape around the barrel 45 of the ribbed post 20, creating a uniform diameter that may promote consistent results and stronger clutch output with an easier clutch input. Any shape and size feasible in exemplary embodiments of the present disclosure is also contemplated. For example, in exemplary embodiments, the external ribs 21 and channels 23 may comprise varying shapes and/or sizes that form a uniform diameter around the barrel 45 of the ribbed post 20. A number of ribs 21, 26 and channels 23, 28 are depicted in FIGS. 1-5, but any feasible number and/or combination of numbers of ribs 21, 26 and channels 23, 28 are contemplated by embodiments of the present disclosure. The internal ribs 26 may be adapted to couple with and/or attach to a bracket. The external ribs 21 may be adapted to receive the inner surface of a torsion spring 50. The ribs 21, 26 and channels 23, 28 are generally depicted in the Figures as comprising the entire length of the ribbed post 20 in straight longitudinal lines. However, the ribs 21, 26 and channels 23, 28 may comprise a length less than the length of the ribbed post and may comprise lines in any feasible angle and any feasible curvature.

Referring again to FIGS. 1-5, in exemplary embodiments, at least one torsion spring 50 can be mounted around the ribbed post 20. The torsion spring 50 can have at least one set of tangs 52 extending radially outward. While the inclusion of one torsion spring 50 is depicted in FIGS. 1-5 for some exemplary embodiments, the inclusion of one or more additional springs in other exemplary embodiments is contemplated by and within exemplary embodiments of the present disclosure. By way of example, two, three, four, five, or eight springs may be included, to name a few. In exemplary embodiments, when multiple springs are included, the springs may be disposed adjacent to each other on the ribbed post 20, the springs may be intertwined, or placed in another feasible configuration. In exemplary embodiments, the torsion spring 50 can comprise a free inside diameter slightly smaller than the outside diameter of the ribbed post 20. In assembly, the torsion spring 50 can be mounted on the ribbed post by expanding the torsion spring 50 such that it slips over the ribbed post 20. When released, the torsion spring 50 can contract on the ribbed post 20 such that the inner surface of the torsion spring 50 rests on, and forms an interference fit with, the outer surface of ribbed post 20. In exemplary embodiments, the ribbed post 20 may be adapted to support a roller shade mounting bracket 200 via the internal ribs 26 of the socket 22.

In exemplary embodiments, the ribbed post 20 can be molded with both internal ribs 26 and external ribs 21. If the ribbed post 20 is molded without the external ribs 21 and only the internal ribs 26, however, heat in the molding process may cause the internal ribs 26 to create "sink marks" in the external surface of the barrel 45 of the cylinder 40, if the external surface is substantially smooth. As used herein, the term "sink marks" may reflect depressions in a smooth surface. Sink marks may create an unpredictably in the shape of the external surface of the barrel 45 of the cylinder 40, thereby making it difficult and time consuming to produce consistent results and ribbed posts comprising substantially similar shapes. As such, the sink marks may lead to inaccurate consistency and predictability with ribbed posts 20 and weaker, inconsistent clutch output and heavier inputs as more effort is made to better output. In exemplary embodiments, the unpredictability of sink marks may be substantially reduced and/or eliminated by forming external ribs 21 disposed longitudinally along the surface of the barrel 45 of the cylinder 40, located where sink marks would otherwise have been. Further, molding the external ribs 21 in the ribbed post 20 also may create a more stable connection with a torsion spring 50 thereby allowing for a lighter and easier input or actuation and a more consistent and powerful clutch output while also reducing the amount of raw materials needed to manufacture the ribbed posts 20. Reducing the raw materials required to manufacture the ribbed post 20 may reduce the environmental impact of the manufacturing process of the ribbed posts 20. Further, molding the external ribs 21 in the ribbed post 20 may also reduce the need for, and the time associated with, correcting and repairing inconsistencies when sink marks are created in ribbed posts 20 molded without the external ribs 21.

In exemplary embodiments, the roller shade clutch 10 including a ribbed post 20 and idler (not shown) may be adapted to be attached to a shade roller (not shown). The clutch 10 may be secured at one end of the shade roller and is used to control the raising and lowering of a window shade wrapped around the shade roller. The idler may be secured to the opposite end of the shade roller and follows the rotation of the shade roller. A bracket 200 may be adapted to be coupled to the clutch 10 and/or idler to mount the assemblies to a structure, such as a ceiling, wall, or window frame.

In exemplary embodiments, the sprocket wheel 30 can be mounted for rotation over the ribbed post 20 and seated within the cavity of the housing 12. The sprocket wheel 30 can include a circular hub 42 and a boss 44 extending axially from the circular hub 42. The hub 42 can have an outer circumferential surface being formed with a plurality of teeth 32 separated by depressions 34. The teeth 32 and depressions 34 are constructed and arranged to entrain the chain 80. The boss 44 can have an inner diameter that can be larger than the diameter of ribbed post 20 so that there is an annular space between the boss 44 and the ribbed post 20 in which the torsion spring 50 is located. The boss 44 can include at least one axial slot 46 having two edges 47, 48 spaced apart by a width larger than the separation between the tangs 52 of the coils spring 50. In assembly, the tangs 52 of the torsion spring 50 are positioned within the slot 46. While the circular hub 42 and boss 44 are illustrated as forming an integral part, the circular hub 42 and boss 44 may also be formed as separate parts.

Figure 6:
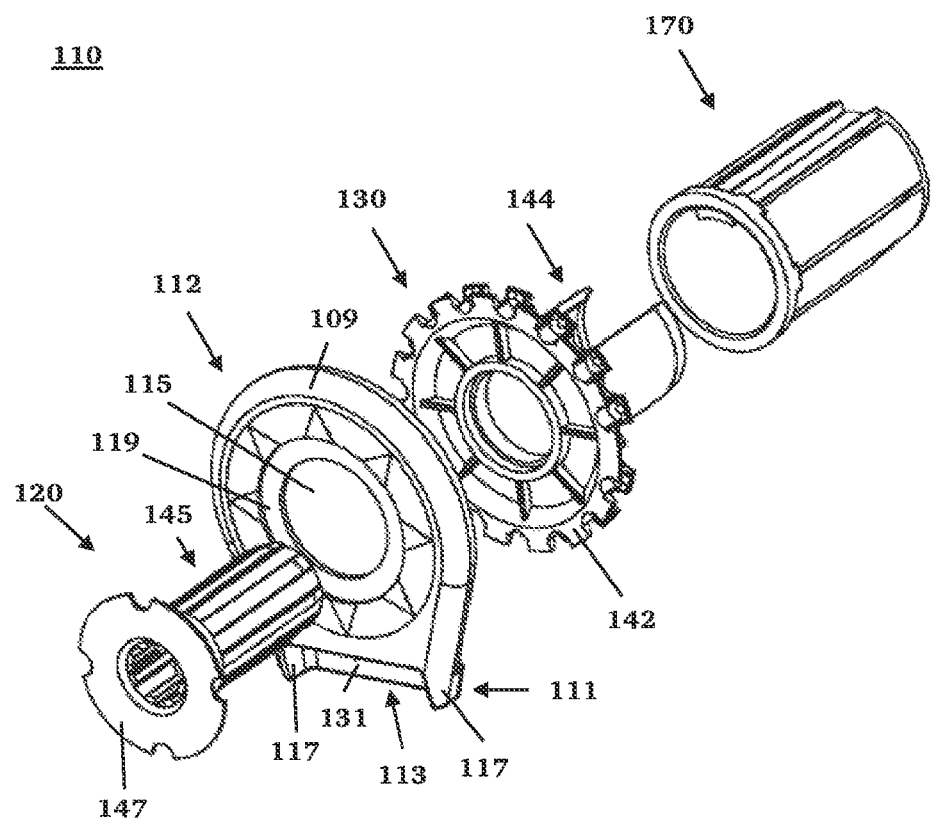
FIG. 6 is an exploded view of an alternative roller shade clutch assembly according to an exemplary embodiment.

In exemplary embodiments, the chain guard 60 can be mounted over the front face of the housing 12, which may also include the guard 14. For example, the chain guard 60 may cover the chain guard 18 as shown in FIGS. 6-7 or a greater area of the front face of the housing 12 (e.g., FIGS. 1-5 show the chain guard 60 covering substantially the entire front face of the housing 12). The chain guard 18 can be a part of the clutch 10 that is susceptible to breakage when the chain 80 is pulled. For example, when the clutch 10 can be mounted to a window frame, users frequently pull the chain 80 outward away from the window frame while pulling downward to operate the clutch 10. As a result, the chain 80 exerts a stress on the chain guard 18, which may cause the chain guard 18 to break. The chain guard 60 reinforces the chain guard 18 to prevent breakage from occurring.

The chain guard 60 may be secured to housing 12 by mechanical fasteners 62, such as screws, pins, rivets, or the like. The fasteners 62 can extend all the way through the housing 12 to the back of an attached bracket 200. The fasteners 62 are placed in locations that do not interfere with the path of the chain 80. For example, fasteners 62 may be disposed within the chain outlet 16 and/or outside the outer edges of the chain outlet 16. Alternatively, as shown in FIG. 6, the chain guard 60 may be rotatably secured to the housing 12 at one end while the opposite end of the chain guard 60 is configured to be releasably secured to the housing 12. This allows the chain guard 60 to be swiveled to be locked in place or moved out of the way as needed.

The follower cap/drum 70 can be disposed over the boss 44 of the sprocket wheel 30. As used herein, the terms "follower cap" and "drum" are used interchangeably. The drum 70 can include at least one axial key 76 on its inside cylindrical surface. The key 76 can have outer walls 77, 78 having a width smaller than the spacing between the tangs 52 of the torsion spring 50. In assembly, the key 76 can be positioned between the tangs 52 of the torsion spring 50. The drum 70 can be secured to the ribbed post 20 to maintain the assembly of the clutch 10, but remains rotatable to follow the rotation of the sprocket wheel 30. For example, the drum 70 may have an axial hole sized and shaped to receive mechanical fastening means 72, such as a screw, in conjunction with a bushing 74 for securing the drum 70 to the ribbed post 20. The drum 70 can be adapted for engagement with a shade roller, such as with axial groove 79 on its outer cylindrical surface.

In exemplary embodiments, the clutch 10 may operate as follows. The torsion spring 50 can be wound such that it is biased to tighten around the stationary ribbed post 20. The friction between the inner surface of the torsion spring 50 and the outer surface of the ribbed post 20 can prevent the sprocket wheel 30 from rotating around the ribbed post 20, which in turn prevents the drum 70 from rotating. The torsion spring 50 may be designed to have a spring force that resists a torque applied to the drum 70 by the weight of an attached window shade (not shown).

When the chain 80 is pulled, the rotational force applied to the torsion spring 50 by the sprocket wheel 30 can use mechanical advantage to overcome the spring force, causing the torsion spring 50 to loosen around the ribbed post 20 to allow for rotation. For example, if the chain 80 is pulled in the clockwise direction, the sprocket wheel 30 rotates in the clockwise direction. This can cause one edge 48 of the slot 46 to rotate clockwise and apply a clockwise force on the outside surface of one of the tangs 52. The torsion spring 50 is wound such that the force on the tang 52 causes the torsion spring 50 to loosen around ribbed post 20. In this manner, the spring torsion spring 50 can allow the sprocket wheel 30 to rotate. If the chain 80 is pulled in the counterclockwise direction, the other edge 47 of the slot 46 applies a counterclockwise force on the other tang 52, causing the torsion spring 50 to loosen around the ribbed post 50 to allow the sprocket wheel 30 to rotate. The rotation of the sprocket wheel 30 can be transmitted to the drum 70 through the key 76 positioned between the tangs 52.

Referring to FIGS. 1-5, a bracket 200 according to an exemplary embodiment can comprise a mounting plate 210, an attachment member 220 adjustably mounted to the mounting plate 210, and an angle bracket 230 adjustably mounted to the mounting plate 210. The bracket 200 can be used for mounting clutch 10 or idler 100 to a structure, such as a wall or ceiling. The bracket 200 can allow for adjustment of the position of the clutch 10 or idler 100 on the bracket 200 and/or for adjustment between a side wall mount position and a top ceiling mount position. While the bracket 200 can be coupled with either the clutch 10 or idler 100, the description hereinafter is described in relation only to the clutch 10. The mounting plate 210, attachment member 220, and angle bracket 230 can be formed of any suitable plastic, metal, or other material. The mounting plate 210 can be any size, material or shape upon which the clutch 10 can be affixed.

The attachment member 220 can be adjustably mounted within a slot 212 in the mounting plate 210. A support slider 216 can be slidably seated in the slot 212 and attached to the attachment member 220 by a mechanical fastener 218, such as a screw. Grooves 214 may be formed adjacent opposite sides of the slot 212 on the rear face of the mounting plate 210 to maintain a flush rear surface on the mounting plate 210. When the fastener 218 is loosened, the attachment member 220 is vertically slidable along the slot 212 to allow for adjustment of the location of the clutch 10. The attachment member 220 then can also be rotated around the support slider 216 such that the attachment member 220 extends either downward or to the side. When the fastener 218 is tightened, the attachment member 220 is fixed in place.

The attachment member 220 can be coupled to the clutch 10. The attachment member 220 can include an insert 222 at one end which is received in a socket 22 in the rear surface of the ribbed post 20 (or in the rear surface of the housing 12). The insert 222 is illustrated as a separate independent component, but may instead be formed integrally with the attachment member 220 or the mounting plate 210. The insert 222 may alternatively be used as the support slider 216. The opposite end of the attachment member 220 can be configured to be secured to the lower end of the housing 12. For example, the attachment member 220 may be secured to the lower end of the housing 12 by a screw or through the use of a locking device 300, examples of which are described below in more detail.

The angle bracket 230 can be secured to the mounting plate 210 by mechanical fasteners 234, such as screws, rivets, or the like, through holes 232. For a top ceiling mount position, the angle bracket 230 can be secured along the upper edge of the mounting plate 210. For a side wall mount position, the angle bracket 230 can be secured along a side edge of the mounting plate 210. Alternatively, the angle bracket 230 may be formed integrally with the mounting plate 210. The bracket 200 may be fastened to a structure, such as a wall, ceiling, or window frame, by the use mechanical fasteners which pass through openings 236 in the angle bracket 230, by an adhesive, or by other means of fastening.

FIGS. 1-5 illustrate various exemplary embodiments of a locking device 300 used to releasably secure a clutch 10 to a bracket 200. It is intended that the locking device can also be used to releasably secure an idler 100 to a bracket 200.

Referring to FIGS. 1-5, according to an exemplary embodiment, the locking device 300 can be a slide lock 310 that can be slidably disposed within a slot 322 formed in the chain guard 18 of the clutch 10. Alternatively, the slide lock 310 may be disposed in a slot formed in the attachment member 220 or mounting plate 210 of the bracket 200. The slide lock 310 can include a protrusion 312 that extends into the chain outlet 16. First and second pins 314, 316 extend from opposing sides of the protrusion along the axis of the slot 322.

When the slide lock 310 is slid upwards along the slot 322 toward the clutch 10, the first pin can be extended into one of the depressions 34 in the sprocket wheel 30 to prevent the sprocket wheel 30 from rotating. This indicates that the clutch 10 is not fully secured to the bracket 200. When the slide lock 310 is slid downward along the slot 322, the first pin is extricated from the depression 24, while the second pin 316 is extended into a receptacle 224 projecting in the attachment member 220 of the bracket 200. This secures the clutch 10 to the bracket 200 and allows the sprocket wheel 30 to rotate, thereby making the clutch 200 operable.

While the bracket 200 is described in conjunction with clutch 10, it is intended that clutch 10 can also be mounted to conventional bracket assemblies that are known in the art. Further, it is intended that bracket 200 can be mounted with conventional clutches that are known in the art.

Referring to FIG. 6, an exploded view of an alternative roller shade clutch assembly 110 according to an exemplary embodiment is shown. In exemplary embodiments, the clutch assembly 110 may comprise a ribbed post 120, a housing 112, a sprocket wheel 130, a circular hub 142, a boss 144, and a drum 170. The ribbed post 120, sprocket wheel 130, hub 142, boss 144, and drum 170 may be substantially similar to those described with respect to FIGS. 1-5.

In exemplary embodiments, the housing 112 may comprise a top portion 109 having a substantially curved shape, an aperture 115 adapted to receive at least a barrel 145 of the ribbed spindle 120, a recessed lip 119 substantially surrounding the circumference of the aperture 115 adapted for receiving a flange 147 of the ribbed spindle 120, and a bottom portion 111 having a substantially flat bottom edge. In exemplary embodiments, the bottom portion 111 may comprise a bridge 131 disposed between opposing feet 117 extending from the housing 112. In exemplary embodiments, the recessed lip 119 may comprise a substantially smooth surface adapted to allow the flange 147 to slidably rotate while in contact with the recessed lip 119. The bridge 113 may comprise a curved portion creating an opening 113 between the inner surface of the bridge 131 and the inner surface of the housing 112 adapted to accept a chain (not shown), or the like. While two exemplary clutch systems including a ribbed post 120 are depicted in FIGS. 1-3 and 6, the ribbed post 120 may be adapted to be included in alternative clutch systems. By way of example, the ribbed post 120 may be included in an A100 clutch, an A200 clutch, and all other feasible clutches.

According to one embodiment, a roller shade clutch mounting assembly comprises a roller shade clutch, a bracket for mounting the roller shade clutch to a structure, and a locking device for releasably coupling the clutch to the bracket.

In at least one embodiment, the locking device comprises an insert having a body portion, a first end that is configured to be secured within a recess formed in a rear facing surface of the clutch, and a second end that is configured to remain extending at least partially beyond the rear surface of the clutch and to be secured by engagement with a slot formed in the bracket.

In at least one embodiment, an edge of the slot in the bracket can be slidably engaged within a recess formed in the second end of the insert to secure the bracket to the insert.

In at least one embodiment, the second end of the insert can include first and second arms extending transversely outward from the body portion in opposite directions, the bracket being inserted into the recess formed between the underside of the first arm and the rear facing surface of the clutch.

In at least one embodiment, the first arm can be longer than the second arm.

In at least one embodiment, the first arm can include one or more tabs extending transversely from the sides of the first arm.

In at least one embodiment, the centerline of the insert can be off-center from the centerline of the bracket when the clutch can be secured to the bracket.

In at least one embodiment, the first end of the insert can include one or more locking tabs for securing the insert within cooperating features formed in the socket of the clutch.

In at least one embodiment, the slot formed in the bracket can be a cross slot including first and second slots oriented for attachment of the clutch to the bracket in positions corresponding to a side wall mount position and a top ceiling mount position.

In at least one embodiment, the first slot can be oriented substantially horizontally and the second slot can be oriented substantially vertically.

In at least one embodiment, the bracket can include a mounting plate and an attachment member extending from the mounting plate.

In at least one embodiment, the attachment member can include an insert projecting therefrom and the clutch contains a socket in the rear surface for receiving the insert.

In at least one embodiment, the locking device can include a slide lock disposed within a slot in one of the clutch and the bracket.

In at least one embodiment, the slide lock can include first and second pins extending from opposite sides along the axis of the slot.

In at least one embodiment, the clutch can be rotatable and secured to the attachment member when the slide lock can be pushed outward from the clutch.

In at least one embodiment, the clutch can be prevented from rotating when the slide lock can be pushed inward toward the clutch.

In at least one embodiment, the locking device can include a clip at the lower end of the attachment member that can be configured to be secured to the lower end of the clutch.

In at least one embodiment, the locking device can include one or more hook-type members extending from the attachment member that can be configured to be secured in a recess in the clutch.

According to one embodiment, a bracket for a roller shade comprises a mounting plate, an attachment member slidably mounted to the mounting plate, and a wall or ceiling engaging member mounted to the mounting plate.

In at least one embodiment, the attachment member can be attached to a support slider seated within a slot formed in the mounting plate.

In at least one embodiment, the attachment member can be rotatable between a wall mount or ceiling mount configuration.

In at least one embodiment, the attachment member can be mounted to the mounting plate with a mechanical fastener, the attachment member being adjustable when the mechanical fastener can be loosed and secured in place when the mechanical fastener can be tightened.

In at least one embodiment, the wall or ceiling engaging member can be releasably mounted to the mounting plate to be adjustable between a wall mount or ceiling mount configuration.

In at least one embodiment, the wall or ceiling engaging member can be integrally formed with the mounting plate.

According to one embodiment, a roller shade clutch comprises a housing having a guard defining a cavity, a chain outlet, and a chain guard spanning the chain outlet, a ribbed post extending axially from the housing, at least one torsion spring mounted on and frictionally engaging said ribbed post, a sprocket wheel being mounted for rotation over the ribbed post and seated within the cavity, a chain guard cover disposed over at least a portion of the chain guard, and a drum mounted over the ribbed post that can be rotatable in conjunction with the sprocket wheel.

In at least one embodiment, the chain guard cover substantially covers the guard.

In at least one embodiment, the chain guard cover substantially covers a front face of the housing.

In at least one embodiment, one side of the chain guard cover can be pivotably attached to the housing.

According to one embodiment, an idler comprises an inner drum, an outer drum rotatably and slidably disposed over the inner drum, and an end cap fixed over the forward end of the outer drum.

In at least one embodiment, a compression spring can be disposed axially within a cavity in the inner drum, and wherein the compression spring can be in connection between the inner drum and the end cap.

In exemplary embodiments, a roller shade clutch may comprise a housing, a ribbed post extending axially from the housing, a sprocket wheel mounted for rotation around the ribbed post, at least one torsion spring mounted for rotation on the ribbed post, a chain guard, a boss extending axially fro the sprocket wheel, and a drum disposed over the ribbed post, the torsion spring and the boss.

In exemplary embodiments, a ribbed spindle and/or ribbed post for a clutch for a roller shade can comprise a cylinder comprising an open end and a closed end and a barrel comprising a plurality of alternating ribs and channels extending between the open end and the closed end. In exemplary embodiments, the ribbed spindle and/or ribbed post for may further comprise a flanged rim attached to the circumference of the barrel adjacent the open end. In exemplary embodiments, the flanged rim may comprise one or more cut-outs. In exemplary embodiments, the cut-outs may comprise a substantially semi-circular shape. In exemplary embodiments, the flanged rim may comprise a number of cut-outs spaced at equal distances apart along the circumference of the flanged rim.

In exemplary embodiments, the plurality of ribs can form a consistent and/or uniform circular outer diameter. In exemplary embodiments, the outer diameter of the plurality of ribs may be adapted to receive an inner diameter of a spring or springs, and further adapted to allow the spring or springs to actuate in a substantially consistent and predictable manner, thereby strengthening the output of a clutch for a roller shade.

Now that exemplary embodiments of the present disclosure have been shown and described in detail, various modifications and improvements thereon will become readily apparent to those skilled in the art.

It will be understood that one or more of the steps described can be rearranged, separated, and/or combined without deviating from the scope of embodiments of the disclosure. For ease, steps are, at times, presented sequentially. This is merely for ease and is in no way meant to be a limitation.

Further, it will be understood that one or more of the elements and/or exemplary embodiments of the disclosure described can be rearranged, separated, and/or combined without deviated from the scope of the disclosure. For ease, various elements are described, at times, separately. This is merely for ease and is in no way meant to be a limitation.

While the various steps, elements, and/or exemplary embodiments of the disclosure have been outlined above, it is evident that many alternatives, modifications and variations will be apparent to those skilled in the art. The various steps, elements, and/or exemplary embodiments of the disclosure, as set forth above, are intended to be illustrative, not limiting. Various changes can be made without departing from the spirit and scope of the disclosure. Accordingly, the spirit and scope of the present disclosure is to be construed broadly and not limited by the foregoing specification.

No element, act, or instruction used in the description of the present application should be construed as critical or essential to the disclosure unless explicitly described as such. Also, as used herein, the article "a" is intended to include one or more items. Where only one item is intended, the term "one" or similar language is used.

Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. In addition, as used herein, the term "set" is intended to include any number of items, including zero. Further, as used herein, the term "number" is intended to include any number, including zero.

What is claimed:

1. A system for operating and positioning a window shade, comprising:
a roller shade clutch comprising:
a housing;
a ribbed post extending axially from the housing, wherein the ribbed post comprises a cylinder comprising an open end, a closed end, a shoulder adjacent the open end, an internal surface and an external surface, and a barrel comprising a plurality of alternating ribs and channels on at least the external surface substantially extending between the closed end and the shoulder;
a sprocket wheel mounted for rotation around the ribbed post;
a boss extending axially from the sprocket wheel attached to the sprocket wheel, the boss having a proximal end and a distal end and an axial slot substantially extending between the proximal end and the distal end;
at least one torsion spring mounted for rotation on the ribbed post;
a chain guard; and
a drum disposed over the boss, the at least one torsion spring, and the ribbed post.

2. The system of claim 1, wherein the ribbed post further comprises a flanged rim attached to the circumference of the shoulder adjacent the open end.

3. The system of claim 2, wherein the flanged rim comprises one or more cut-outs.

4. The system of claim 3, wherein the one or more cut-outs comprise a substantially semi-circular shape.

5. The system of claim 2, wherein the flanged rim comprises one or more cut-outs spaced at equal distances apart along the circumference of the flanged rim.

6. The system of claim 1, wherein the plurality of alternating ribs and channels are formed on both the external surface of the ribbed post substantially extending between the closed end and the shoulder and on the internal surface of the ribbed post substantially extending between the closed end of the ribbed post and the open end ribbed post.

7. The system of claim 1, wherein the plurality of ribs form a substantially uniform circular outer diameter.

8. The system of claim 7, wherein the substantially uniform circular outer diameter of the plurality of ribs is adapted to receive an inner diameter of the torsion spring.

9. The system of claim 8, wherein the substantially uniform circular outer diameter of the plurality of ribs is further adapted to allow the torsion spring to actuate in a substantially consistent and predictable manner, thereby easing the input and strengthening the output of a clutch for a roller shade.

10. The system of claim 8, wherein the shoulder comprises a substantially uniform surface adapted to receive at least a portion of the inner diameter of the torsion spring, thereby longitudinally securing the torsion spring and preventing the spring from longitudinally slipping.

11. The system of claim 1, wherein the plurality of alternating ribs and channels comprises at least 3 ribs and at least 3 channels.

12. The system of claim 1, wherein the plurality of alternating ribs and channels comprise a longitudinal length extending less than the longitudinal length between the open end and the closed end of the cylinder.

13. The system of claim 1, wherein the plurality of alternating ribs and channels comprise a longitudinal length half the longitudinal length between the open end and the closed end of the cylinder.

14. The system of claim 1, wherein the ribs on the external surface of the ribbed post correspond with channels on the internal surface of the ribbed post.

15. The system of claim 1, wherein the channels on the external surface of the ribbed post correspond with ribs on the internal surface of the ribbed post.

* * * * *